United States Patent
Aizawa (10) Patent No.: US 7,517,162 B2
(45) Date of Patent: Apr. 14, 2009

(54) PRINTER CONFIGURED TO CALCULATE POWER CONSUMPTION DATA FOR PRINTERS ON A NETWORK

(75) Inventor: Fumio Aizawa, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 309 days.

(21) Appl. No.: 11/425,705

(22) Filed: Jun. 22, 2006

(65) Prior Publication Data

US 2008/0003033 A1 Jan. 3, 2008

(51) Int. Cl.
 *G06F 1/26* (2006.01)
(52) U.S. Cl. .................. 400/62; 358/1.14; 713/300; 713/320
(58) Field of Classification Search .............. None
See application file for complete search history.

(56) References Cited

U.S. PATENT DOCUMENTS 6,724,493 B1 * 4/2004 Maruta et al. .............. 358/1.14
7,103,787 B2 * 9/2006 Cantwell ................... 713/320
2002/0116482 A1 * 8/2002 Maeda ....................... 709/223
2002/0144162 A1 * 10/2002 Tada et al. .................. 713/300

FOREIGN PATENT DOCUMENTS

JP 2002297357 A * 10/2002
JP 2004-62359 A 2/2004

* cited by examiner

*Primary Examiner*—Jill E. Culler
(74) *Attorney, Agent, or Firm*—Shinjyu Global IP (57) ABSTRACT

A printer includes an identification unit that calculates the amount of power that will be consumed by each of a plurality of printers on a network. The printer stores power consumption calculating data for each of the printers on the network, and will identify the printer on the network having the lowest power consumption for a particular print job. The printer also includes a unit that will transfer the received print data to the printer identified by the identification unit, if the identified printer is one other than the printer that originally received the print data. This unit will also instruct the client personal computer that transmitted the print data to display a message indicating that the print data has been transferred to another printer, as well as data about the printer to which the print data has been transferred.

3 Claims, 9 Drawing Sheets

MODEL NAME: KM-3550

IP ADDRESS: 10.181.12.34

INSTALLATION SITE: IN FRONT OF 4F-SOUTH MEETING ROOM

PRINTER CONFIGURED TO CALCULATE POWER CONSUMPTION DATA FOR PRINTERS ON A NETWORK

BACKGROUND OF THE INVENTION

1. Field of the Invention

The present invention relates to a printer used in a system in which a plurality of printers and a client personal computer (hereinafter referred to as a client PC) are connected through a network, and each of the plurality of printers is able to communicate with the other printers and the client PC. Note that a copying machine having a printer function (i.e., a multifunction device) is included in the category of printers.

2. Background of the Invention

Japan Patent Application Publication 2004-62359 discloses a printing system in which a plurality of printers, a client PC, and a printer administrative server that controls data on each of the plurality of printers (i.e., printer data) are connected to a network. The client PC can obtain the printer data by accessing the printer administrative server. Here, a list of the printer data is displayed on the client PC, in ascending or descending order of the power consumption thereof. A user of the client PC can select a printer to be used for printing from this list on the screen.

In the above described publication, the method by which the power consumption of each of the plurality of printers is determined is not disclosed. However, the power consumption is determined independently of the number of sheets to be printed, and the like. Therefore, it is thought that the power consumption of each of the plurality of printers is determined by the technical specifications for each printer, such as the maximum power consumption, the energy consumption efficiency of the printers, and the like. In this type of method for determining power consumption, it is impossible to calculate the actual power consumption for a given number of sheets to be printed.

In view of the above, it will be apparent to those skilled in the art from this disclosure that there exists a need for a user to be able to request printing from a printer that will consume the least amount of power for a particular print job. This invention addresses this need in the art as well as other needs, which will become apparent to those skilled in the art from this disclosure.

SUMMARY OF THE INVENTION

The printer according to the present invention is comprised of a communication unit that communicates with other printers and a client personal computer via a network, a printing unit that performs printing based on print data received by the communication unit, a storage unit that defines data used for calculating the power consumption needed to perform printing as power consumption calculating data, and stores the power consumption calculating data for both the printer and the other printers on the network, an arithmetic unit that calculates the power consumption required to process the print data received from the client personal computer based on the power consumption calculation data of each of the printers and the print data, an identification unit that will identify the printer on the network having the lowest power consumption based on the calculation result by the arithmetic unit, a printing control unit that will instruct the printing unit to perform a print process based upon the received print data when the printer identified by the identification unit is the printer itself, and a communication control unit that will instruct the communication unit to transfer the received print data to another printer on the network when the printer identified by the identification unit is that other printer.

According to the present invention, when a print command is transmitted from a client personal computer to a printer in a system in which a plurality of printers and the client personal computer are connected through a network, and each of the plurality of printers can communicate with the other printers and the client personal computer, it will be possible for the printer of the present invention to have a print process performed on the printer having the lowest power consumption for a particular print job.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Method for Calculating Power Consumption Required for Printing

First, a method for calculating the power consumption required when a print process is performed by a printer will be described.

Figure 1:
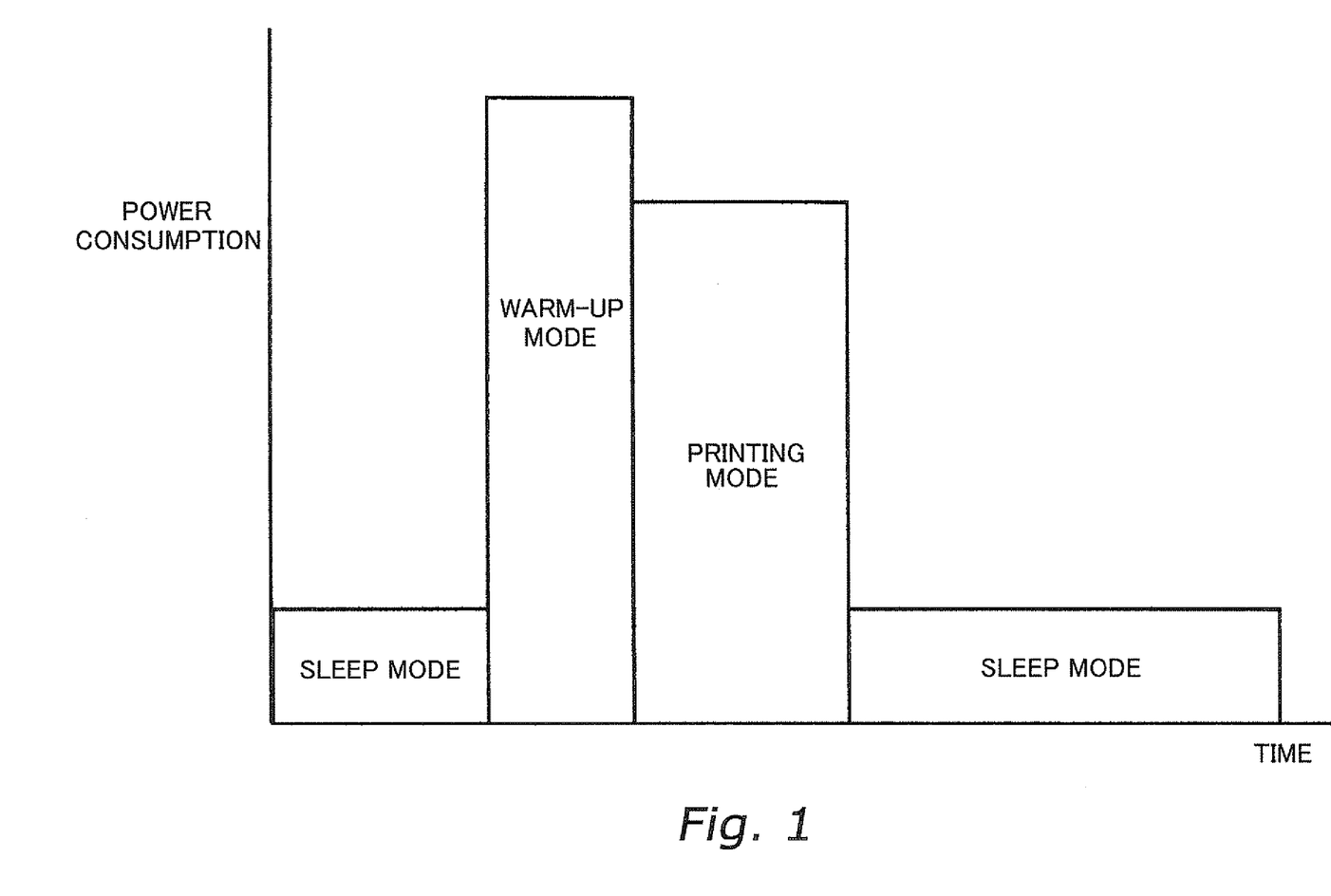
FIG. 1 shows a power consumption model when a print command is input in the sleep mode.

FIG. 1 shows a power consumption model when a print command is input in the sleep mode.

If a print command is input in the sleep mode, a warm-up is performed and then printing is executed.

Figure 2:
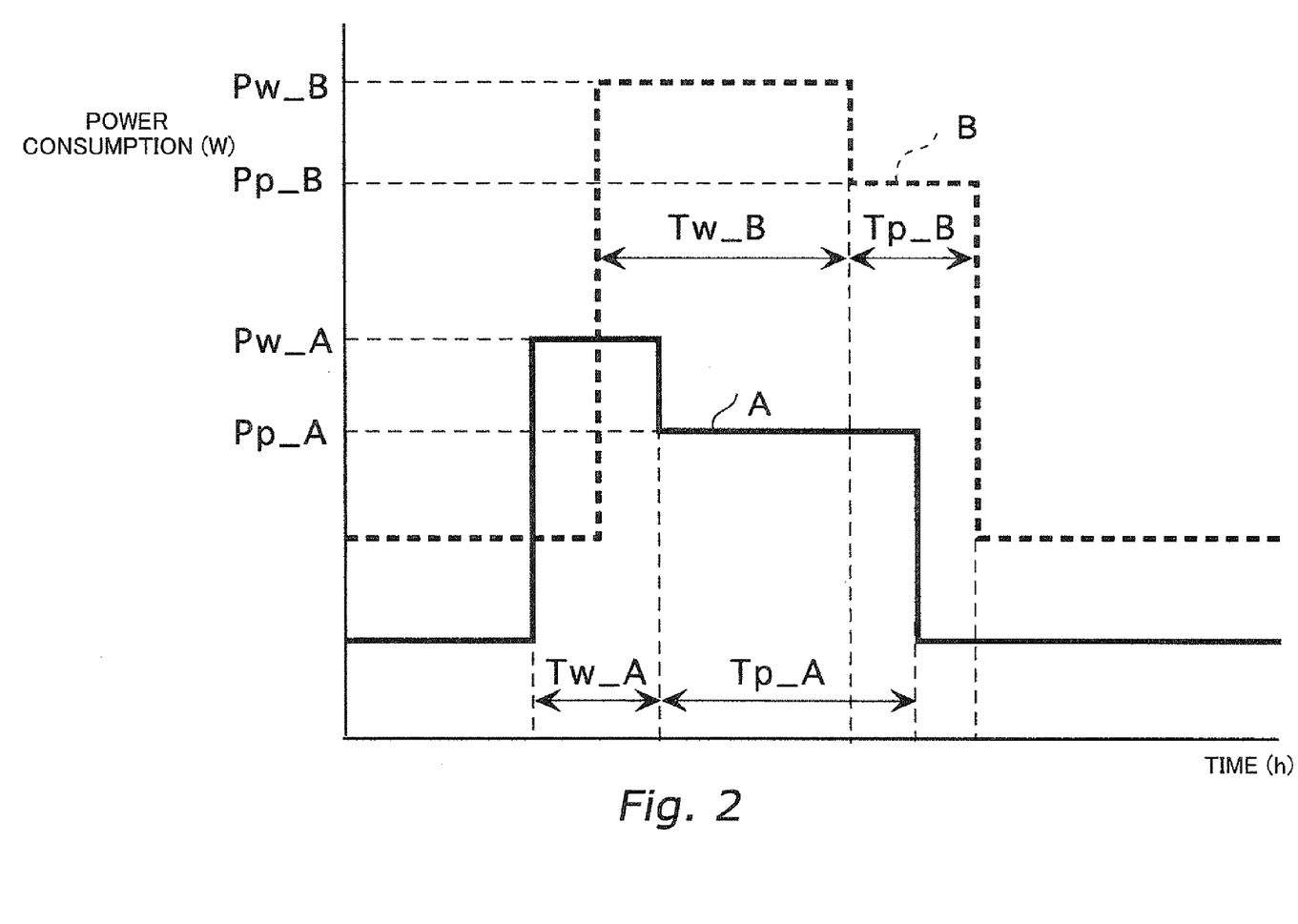
FIG. 2 shows a power consumption model of a low-speed machine and that of a high-speed machine when a print command is input in the sleep mode.

FIG. 2 shows a power consumption model of a low-speed machine and that of a high-speed machine when a print command is input in the sleep mode.

In FIG. 2, the solid line A shows the power consumption model of a low-speed machine A. On the other hand, the dashed line B shows the power consumption model of a high-speed machine B. If a small number of sheets is to be printed, the power consumption (i.e., wattage "W") of the low-speed machine A is lower than that of the-high speed machine B. However, if a large number of sheets is to be printed, the power consumption of the high-speed machine B will be lower than that of the low-speed machine A.

The power consumption (W) per unit time during each mode (i.e., the warm-up mode and the print mode) of the low-speed machine A and the high-speed machine B is defined as shown in Table 1. In addition, the amount of time required for warm-up (warm-up mode) and printing (print mode) in the low-speed machine A and the high-speed machine B is defined as shown in Table 2.

TABLE 1

| Mode | Power consumption (W) | |
| --- | --- | --- |
| | Low-speed machine A | High-speed machine B |
| During warm-up | Pw_A | Pw_B |
| During printing | Pp_A | Pp_B |

TABLE 2

| Mode | Time (h) | |
| --- | --- | --- |
| | Low-speed machine A | High-speed machine B |
| During warm-up | Tw_A | Tw_B |
| During printing | Tp_A | Tp_B |

Power consumption PA is defined as the amount of power consumed by the low-speed machine A from deactivation of the sleep mode to completion of the print mode. On the other hand, power consumption PB is defined as the amount of power consumed by the high-speed machine B from deactivation of the sleep mode to completion of the print mode. Power consumption PA and PB are expressed with the following Formulas (1a) and (1b).

$$PA = Pw\_A \times Tw\_A + Pp\_A \times Tp\_A \quad \text{Formula (1a)}$$

$$PB = Pw\_B \times Tw\_B + Pp\_B \times Tp\_B \quad \text{Formula (1b)}$$

If the print speed per sheet of the low-speed machine A and the high-speed machine B is defined as SA (page per minute (ppm)) and SB (ppm), respectively, and the number of sheets to be printed is defined as n, then the time required for printing (executing the print mode) for the low-speed machine A and the high-speed machine B (i.e., Tp_A and Tp_B) is expressed with the following Formulas (2a) and (2b).

$$Tp\_A = n/(SA \times 60) \quad \text{Formula (2a)}$$

$$Tp\_B = n/(SB \times 60) \quad \text{Formula (2b)}$$

Accordingly, the power consumption PA and PB required for the low-speed machine A and the high-speed machine B from deactivation of the sleep mode to completion of printing, respectively, can be calculated based on Formulas (3a) and (3b).

$$PA = Pw\_A \times Tw\_A + Pp\_A \times n/(SA \times 60) \quad \text{Formula (3a)}$$

$$PB = Pw\_B \times Tw\_B + Pp\_B \times n/(SA \times 60) \quad \text{Formula (3b)}$$

The number of sheets to be printed "n" in which PA is larger than PB can be derived from the following formula (4).

$$n > 60 \times SA \times SB \times (Pw\_B \times Tw\_B - Pw\_A \times Tw\_A)/(SB \times Pp\_SA \times Pp\_B) \quad \text{Formula (4)}$$

Table 3 shows a specific example of the power consumption per unit time (W) required for the low-speed machine A and the high-speed B in each mode (i.e., the warm-up mode and the print mode), the time (h) required for the low-speed machine A and the-high speed machine B in the warm-up mode, and the print speed per sheet (ppm) of the low-speed machine A and the high-speed machine B.

TABLE 3

| | Power consumption (W) | | Time (h) | | ppm | |
| --- | --- | --- | --- | --- | --- | --- |
| Mode | Low-speed machine A | High-speed machine B | Low-speed machine A | High-speed machine B | Low-speed machine A | High-speed machine B |
| During warm-up | 1400 | 2000 | 0.00833 | 0.0167 | 15 | 50 |
| During printing | 1100 | 1500 | Tp_A | Tp_B | | |

In the example shown in Table 3, the number of copies to be printed "n" in which PA is larger than PB is derived as follows: n>30.09877. In other words, if 31 or more sheets are to be printed, the power consumption required for the high-speed machine B will be lower than that required for the low-speed machine A.

System Configuration

Figure 3:
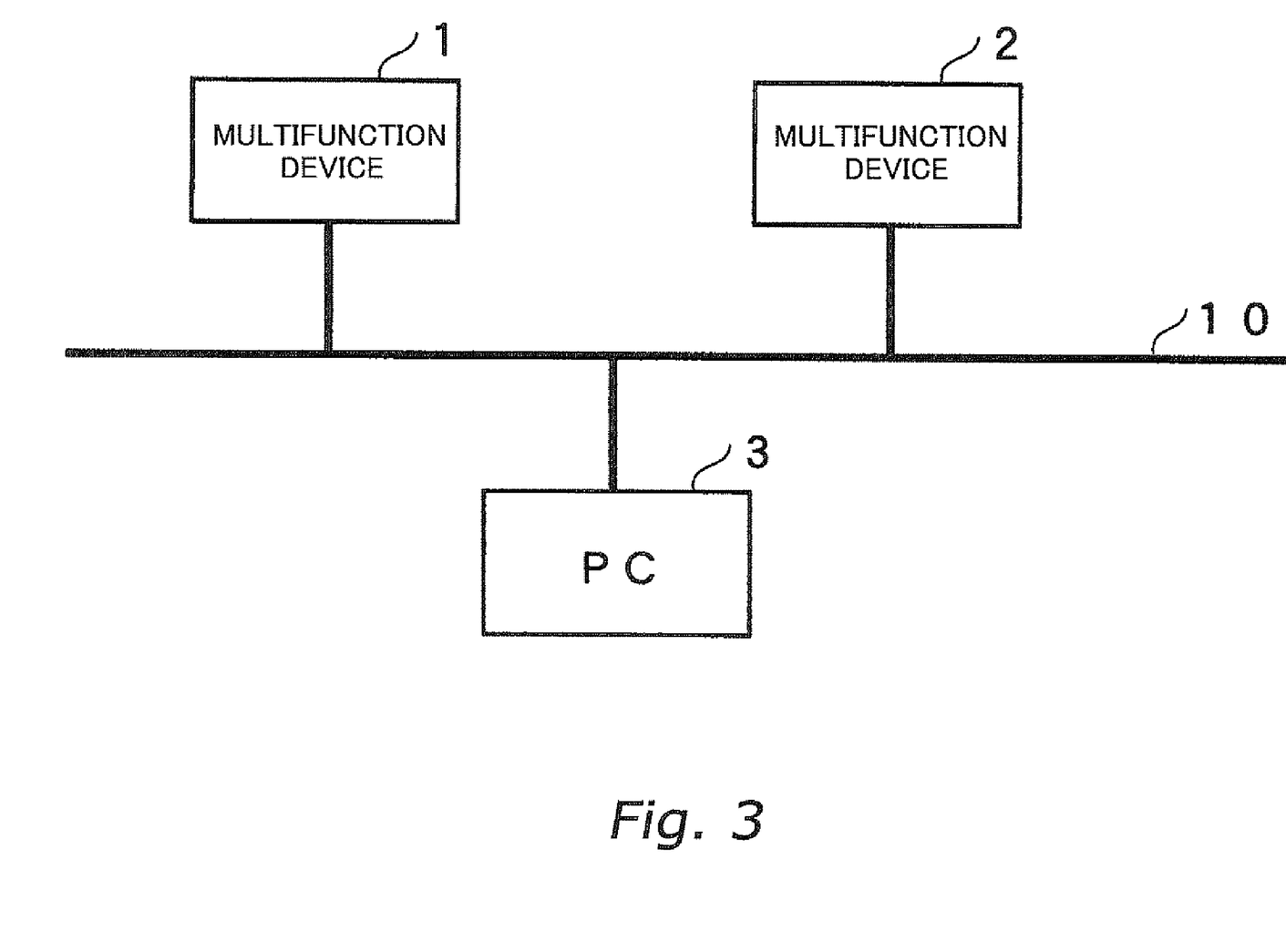
FIG. 3 is a block diagram showing a network system configuration.

FIG. 3 shows a network system configuration.

A plurality of multifunction devices (printers) 1 and 2, and a client personal computer (client PC) 3 are connected to a network (local area network (LAN)) 10. Each of the multifunction devices 1 and 2 has a copy function and a print function.

Configuration of the multifunction device 1 will be hereinafter described. Note that the configuration of the multifunction device 2 is the same as that of the multifunction device 1.

Figure 4:
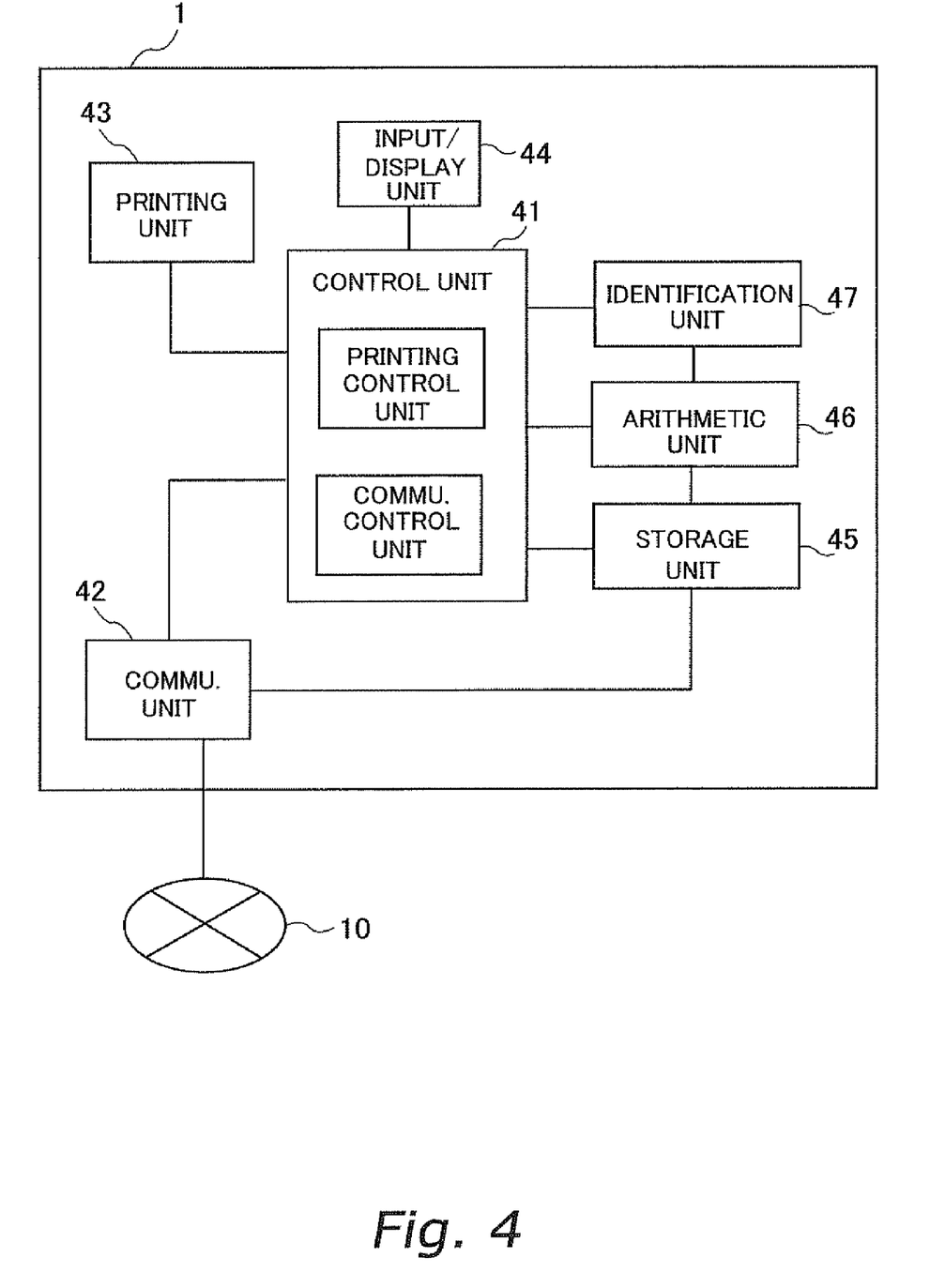
FIG. 4 is a block diagram showing the configuration of the major portions of a multifunction device in accordance with one embodiment of the present invention.

The multifunction device 1 comprises a control unit 41, a communication unit 42, a printing unit 43, and an input/display unit 44. The control unit 41 controls the operation of each of the units included in the multifunction device 1. The communication unit 42 communicates with the multifunction device 2 and the client PC 3 via the network 10. The printing unit 43 performs printing based on the print data that the communication unit 42 receives from the multifunction device 2 or the client PC 3. The input/display unit 44 comprises one or more keys through which a user command input is received, and a display screen for displaying data to a user. In addition, the multifunction device 1 comprises a storage unit 45, an arithmetic unit 46, and an identification unit 47.

The storage unit 45 can store data concerning the multifunction device 1 and the multifunction device 2 based on data from the communication unit 42 and the input/display unit 44. In particular, the storage unit 45 can, for example, store the following data as power consumption calculation data for the multifunction device 1 and the multifunction device 2: time required for warm-up (i.e., Tw (h)), power consumption per unit time during warm-up (i.e., Pw (W)), power consumption per unit time during printing (i.e., Pp (W)), and print speed per sheet (i.e., S (ppm)).

In addition, the arithmetic unit 46 can calculate the power consumption for each of the multifunction devices 1 and 2 based on the power consumption calculation data stored in the storage unit 45. The method for calculating the power consumption is as described above.

The identification unit 47 will identify which multifunction device has the lowest power consumption based on the computation results of the arithmetic unit 46. Then, the identification unit 47 will transmit the results of the identification to the control unit 41.

Note that a printing control unit 41a that serves to control the printing unit 43, and a communication control unit 41b that serves to control the communication unit 42, are provided for the control unit 41. Accordingly, the control unit 41 can control the printing unit 43 and the communication unit 42 based on the output results from the identification unit 47.

Multifunction device data including the model name, the IP address, the data required for calculating power consumption (i.e., power consumption calculation data), and the like is pre-registered in the above described storage unit 45.

The power consumption calculation data is comprised of the time required for warm-up (i.e., Tw (h)), the power consumption per unit time during warm-up (i.e., Pw (W)), the power consumption per unit time during printing (i.e., Pp (W)), and the print speed per sheet (i.e., S (ppm)). The arithmetic unit 46 can calculate the power consumption P using the following Formula (5), based on the above described data and the number of sheets to be printed "n".

$$P = Pw \times Tw + Pp \times n/(S \times 60) \quad \text{Formula (5)}$$

In addition, the control unit 41 will instruct the storage unit 45 to store data on the multifunction device 2 connected to the network 10, based on the user commands received through the input/display unit 44.

Figure 5:
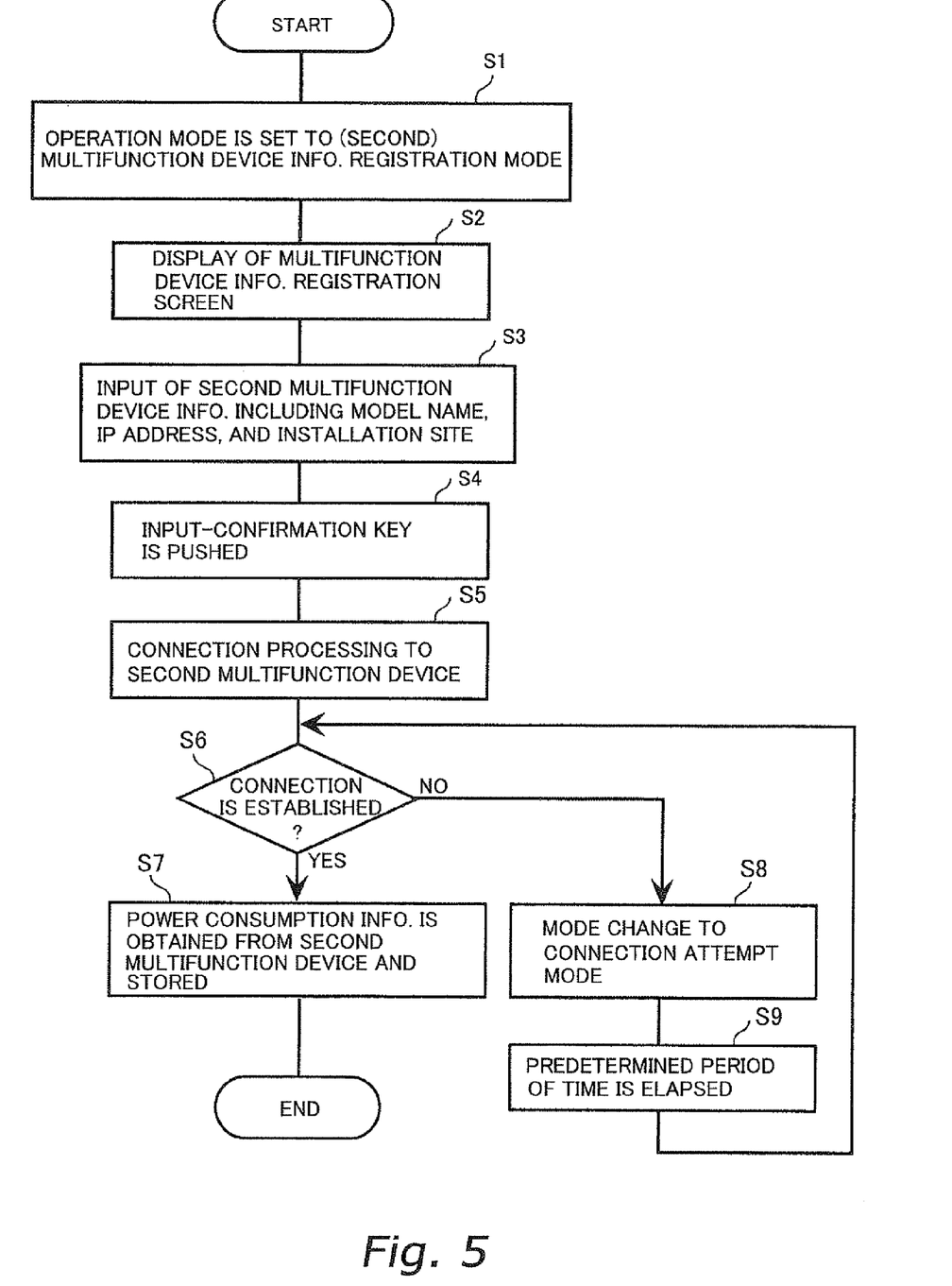
FIG. 5 is a flow chart showing a series of processes that a first multifunction device will perform in order to register data about a second multifunction device.

FIG. 5 shows a series of processes that are executed when a user instructs either multifunction device 1 or 2 to register data about the other multifunction device.

Figure 6:
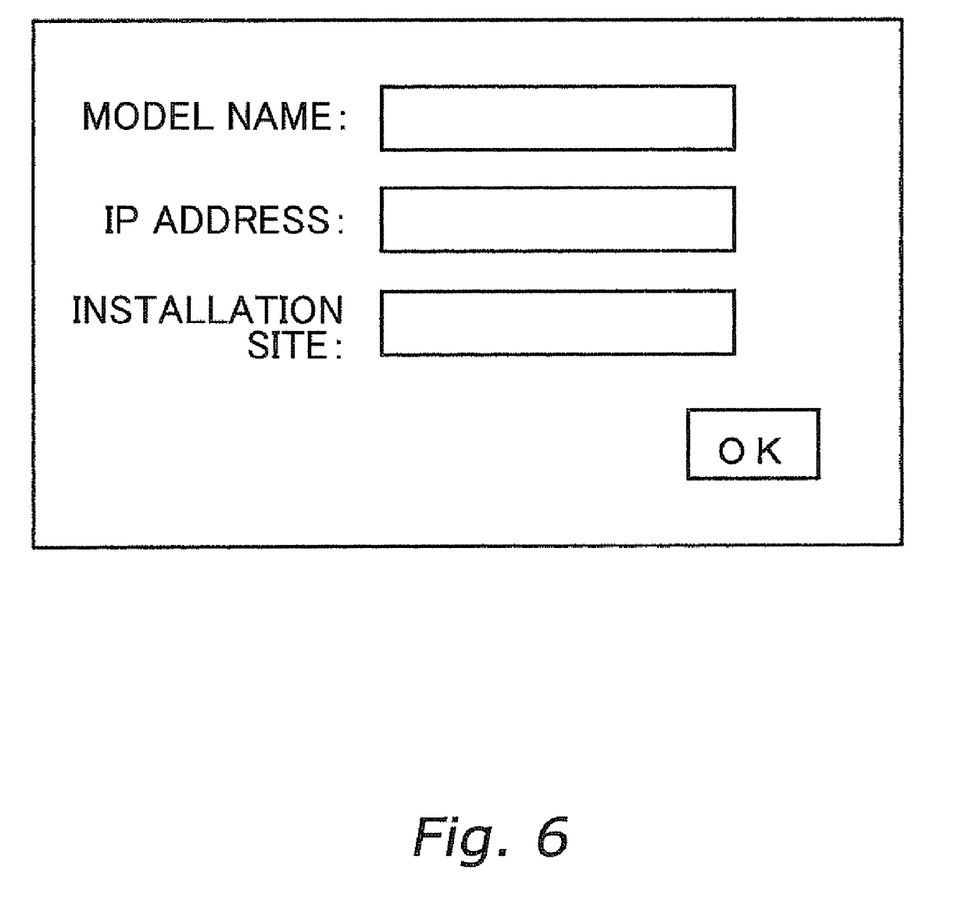
FIG. 6 shows an example of a registration screen for registering multifunction device data.

A user command is received through the input/display unit 44 provided in a multifunction device (hereinafter called a first multifunction device). Then, the control unit 41, which is provided in the first multifunction device, sets the operation mode of the first multifunction device to a mode for registering data about the other multifunction device (hereinafter called a second multifunction device) based on the user command (Step S1). If the operation mode of the first multifunction device is set to the registration mode for registering the second multifunction device data, a screen for registering the multifunction device data will be displayed as shown in FIG. 6 (Step S2).

Figure 7:
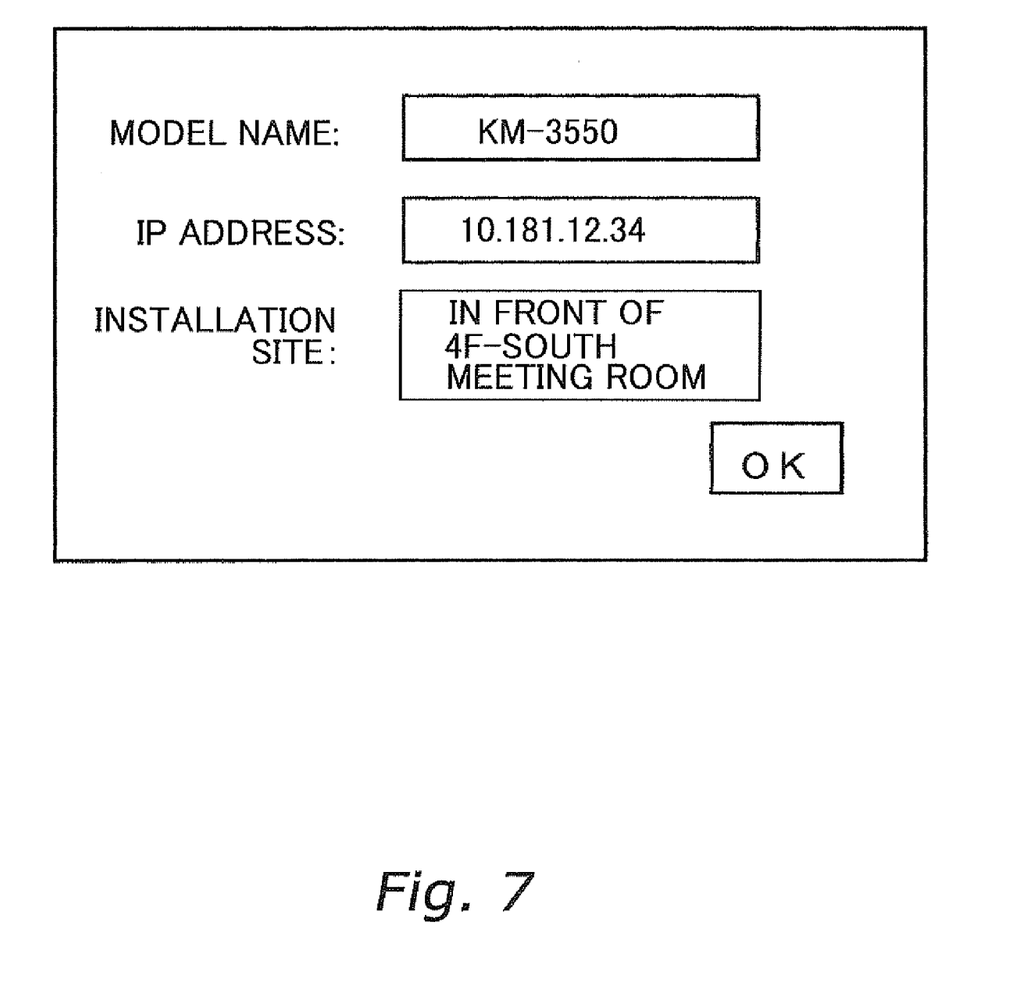
FIG. 7 shows an example of a registration screen for registering the multifunction device data shown in FIG. 6 when a model name, an IP address, and an installation location are input therein.

As shown in FIG. 7, a user will input the second multifunction device data including the model name, the IP address, and the installation site (Step S3), and then push an input-confirmation key such as an OK button (Step S4). If the input-confirmation key (i.e., the OK button) is pushed, the first multifunction device will perform a process for connecting the first multifunction device to the second multifunction device using the input IP address. If the first and the second multifunction devices are successfully connected (YES in Step S6), the communication unit 42 will obtain power consumption data concerning the second multifunction device from the second multifunction device, and the storage unit 45 will store the power consumption data as well as the input data in the above described Step S3 as second multifunction device data (Step S7).

If the connection between the first and the second multifunction devices cannot be established, the communication unit 42 will change the connection mode to a mode in which several attempts are periodically made to connect the first multifunction device and the second multifunction device (Step S8). Then, after a predetermined period of time has elapsed (Step S9), Step S6 will be performed again.

Figure 8:
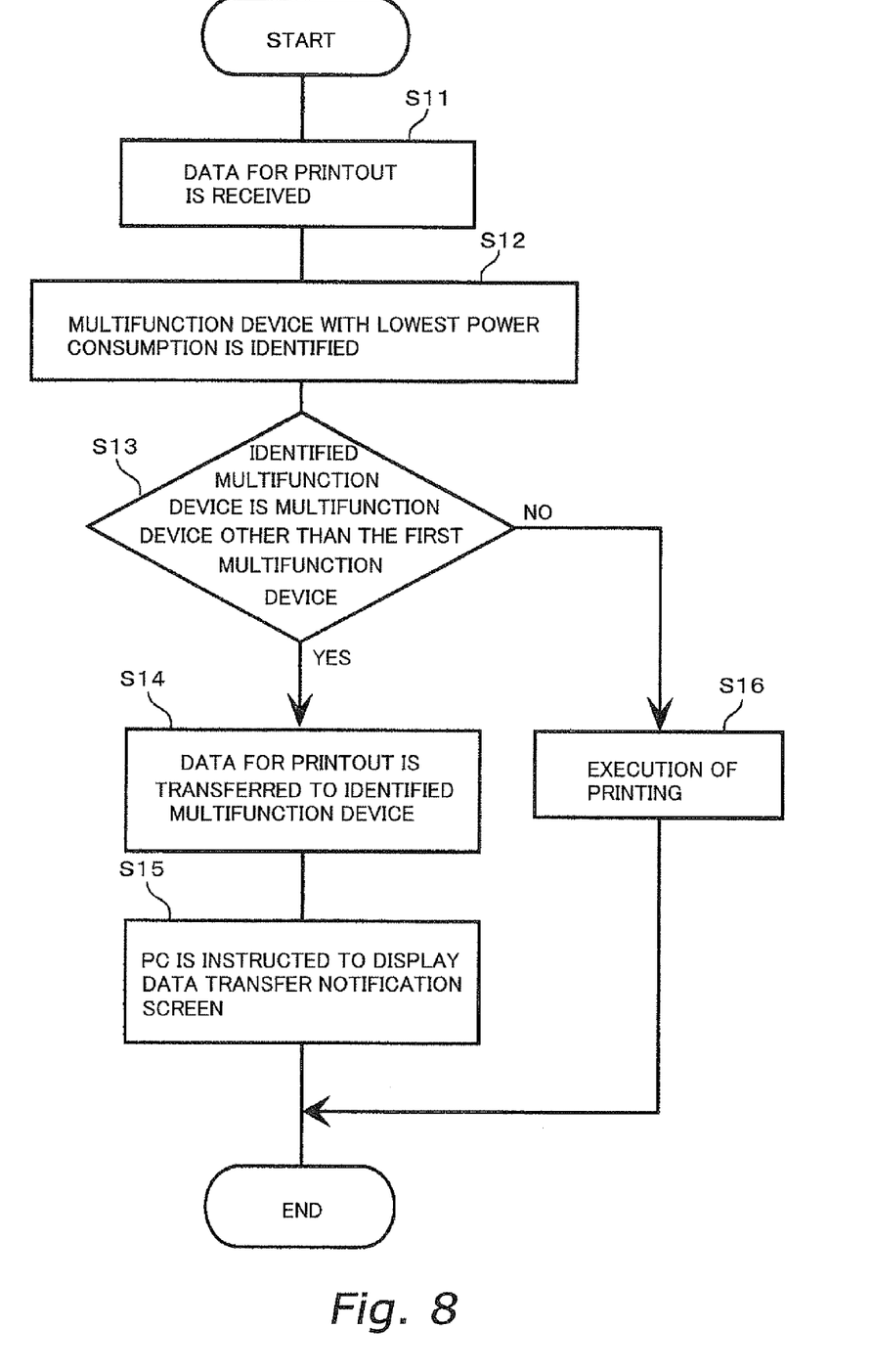
FIG. 8 is a flow chart showing a series of processes executed when a client PC transmits printout data to a multifunction device through a print driver and a spooler.

FIG. 8 shows a series of processes that are executed when print data (defined herein as the text and/or images to be printed and the number of sheets to be printed) is transmitted from the client PC 3 to a multifunction device by a print driver and a spooler.

If the communication unit 42 of the first multifunction device receives print data from the client PC 3 (Step S11), the arithmetic unit 46 provided in the first multifunction device will calculate the power consumption of each of the multifunction devices based on the power consumption calculation data stored in the storage unit 45. Then, the identification unit 47 will identify which of the first multifunction device and the second multifunction device will consume the least amount of power based on the computation result of the arithmetic unit 46.

In other words, based on the above described Formula (5), the power consumption required for the printing process will be calculated for each of the multifunction devices connected to the network (i.e., each of the multifunction devices whose data is registered). Then, the multifunction device whose calculated power consumption is the lowest will be identified.

Figure 9:
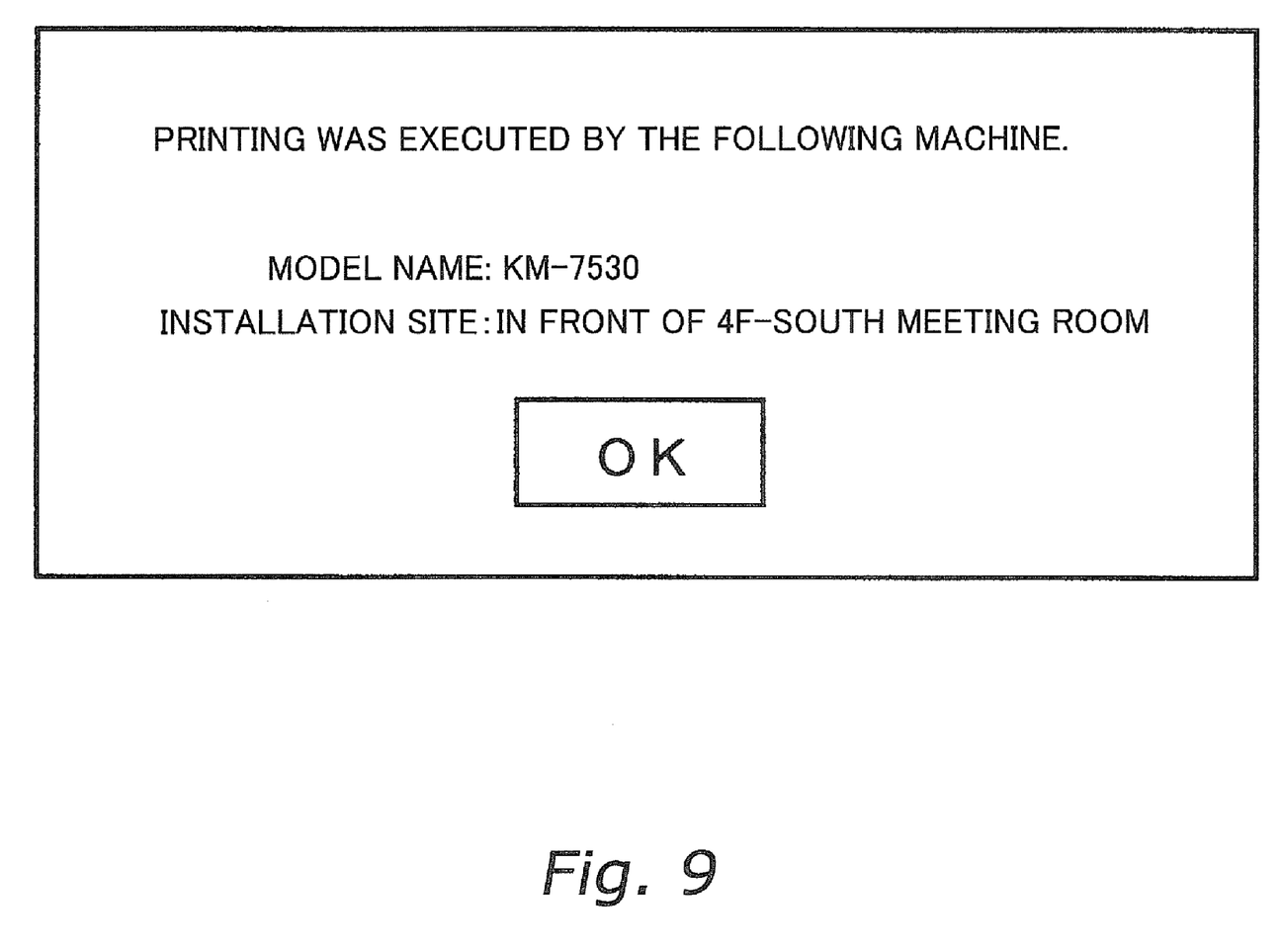
FIG. 9 shows an example of a data transfer notification screen.

If the multifunction device identified as having the lowest power consumption by the identification unit 47 is another multifunction device (here, the second multifunction device) and not the first multifunction device (YES in Step S13), the communication control unit 41b will instruct the communication unit 42 to transfer the print data to the identified second multifunction device based on the identification results (Step S14). Furthermore, as shown in FIG. 9, in order to notify the user of the client PC 3 that the print data has been transmitted to another multifunction device, and notify the user of, for example, the model name and the installation site of the multifunction device to which the data has been transmitted, the communication control unit 41b will instruct the client PC 3 to display the data on the second multifunction device to which the print data has been transmitted (i.e., in this example, the model name and the installation site of the second multifunction device) and that the second multifunction device has been instructed to perform printing. This data will be displayed as a data transfer notification screen via the communication unit 42 (Step S15). Based on the data transfer in Step S14, printing is performed by the second multifunction device, and the process is terminated thereafter.

In the above described Step S12, if the multifunction device identified as having the lowest power consumption is the first multifunction device (NO in Step S13), a printing process will be performed by the first multifunction device (Step S16), and the process is terminated thereafter.

The multifunction device in accordance with the present embodiment can be configured in the following configurations 1 to 3.

Configuration 1

A printer is used in a system in which a plurality of printers and client personal computers are connected to a network, and each printer can communicate with the other printers and client personal computers. The printer comprises four units. The first unit is a storage unit that stores power consumption calculation data on the printer in which this storage unit is included, and power consumption calculation data on each of the other printers in the network. Here, data used for calculating the power consumption required for performing printing from the sleep mode is defined as the power consumption calculation data. The second unit is an identification unit. If print data is received from the client personal computers, the identification unit will calculate the power consumption required for the printing process with respect to the received print data for each printer on the network, and will identify the printer having the lowest power consumption. The third unit serves to print the received print data if the printer in which this unit is included is the printer having the lowest power consumption. The fourth unit serves to transfer the received print data to the printer having the lowest power consumption if this printer is one other than the printer in which this unit is included, and also instructs the client personal computer to display a message to the user in order to inform him or her that the printing data has been transferred to the other printer and in order to provide him or her with data about that printer (such as its model name and installation site).

Configuration 2

The printer according to the above described configuration 1 is configured so that the power consumption calculation data includes data on the time required for warm-up (i.e., Tw (h)), the power consumption per unit time during warm-up (i.e., Pw(W)), the power consumption per unit time during printing (Pp (W)), and the printing speed per sheet (i.e., S (ppm))

Configuration 3

The printer according to the above described configuration 2 is configured so that the identification unit calculates the power consumption P based on the formula "P=Pw×Tw+Pp× n/(S×60)," given that the number of copies to be printed is "n."

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer, comprising:
   a communication unit configured to communicate with one or more other printers and a client personal computer via a network;
   a printing unit configured to execute printing based on print data received by the communication unit;
   a storage unit configured to define data for calculating the power consumption required to perform printing as power consumption calculating data, and store the power consumption calculating data for the printer and the power consumption calculation data for each of the one or more other printers on the network, the power consumption calculation data comprises time required for warm-up (Tw (h)), power consumption per unit time during warm-up (Pw (W)), power consumption per unit time during printing (Pp (W)) and print speed per sheet (S (ppm));
   an arithmetic unit configured to calculate the power consumption required to process the print data received from the client personal computer based on the power consumption calculation data for each of the printers and the print data;
   an identification unit configured to identify the printer on the network having the lowest power consumption based on the calculation results of the arithmetic unit;
   a printing control unit configured to instruct the printing unit to perform the print process based upon the received print data when the printer identified by the indentification unit is the printer itself; and
   a communication control unit configured to instruct the communication unit to transfer the received print data to another printer when the printer identified by the identification unit is that other printer.

2. The printer according to claim 1, wherein the communication control unit is configured to instruct the communication unit to transfer the print data to the identified printer, and instruct the communication unit to transmit a display command to the client personal computer that will display data thereon indicating that the print data has been transferred to the identified printer.

3. The printer according to claim 1 wherein the identification unit is configured to calculate the power consumption P based on a formula P=Pw×Tw+Pp×n/(S×60), wherein the number of sheets to be printed is "n."

* * * * *